United States Patent Office  
3,658,798  
Patented Apr. 25, 1972

3,658,798  
ANTIPARASITIC THIENYL THIAZOLES  
Patrick Roffey, Camberley, Surrey, and John Pomfret Verge, Henley-on-Thames, England, assignors to Lilly Industries, Ltd., Wimbledon, London, England  
No Drawing. Filed Aug. 20, 1969, Ser. No. 851,755  
Claims priority, application Great Britain, Aug. 26, 1968, 40,746/68  
Int. Cl. C07d 91/32  
U.S. Cl. 260—240 A    9 Claims

ABSTRACT OF THE DISCLOSURE

2 - (5 - nitro - 2 - thienyl)-4-aminoalkylthiazoles and 2 - [2 - (5 - nitro - 2 - thienyl)vinyl]-4-aminoalkylthiazoles prepared from 5-nitro-2- thiocarbamylthiophene and 5 - nitro - 2 - (2-thiocarbamylvinyl)-thiophene respectively by reaction with an α-haloketone have antibacterial and antitrypanosome activity.

SUMMARY

This invention relates to novel substituted 5-nitrothiophenes. In particular, this invention relates to thiocarbamyl and 2-thiazolyl substituted 5-nitrothiophenes represented by the following general formula:

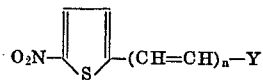

wherein $n$ is 0 or 1 and Y is

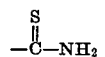

or a 2-thiazolyl group of the formula

wherein Z is $C_1$ to $C_4$ lower alkyl, $C_1$ to $C_3$ lower haloalkyl, phenyl, halophenyl, $C_1$ to $C_3$ lower alkylphenyl or an aminoalkyl substituent of the formula

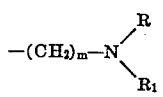

wherein $m$ is an integer from 1 to 3 and R and $R_1$ when taken separately are hydrogen, $C_1$ to $C_4$ lower alkyl, $C_1$ to $C_3$ lower hydroxyalkyl or, when either R and $R_1$ is hydrogen, $C_5$ to $C_8$ cycloalkyl, phenyl, halophenyl or $C_1$ to $C_3$ lower alkylphenyl, and R and $R_1$ when taken toegther represent a 4-membered alkylene or 5-membered alkylene, oxaalkylene, thiaalkylene or azaalkylene bridge which, together with the nitrogen atom to which they are attached form a 5- or 6-membered heterocyclic ring; and when Z is

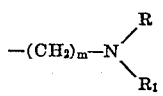

the pharmaceutically acceptable acid addition salts thereof.

The present invention includes within its scope the pharmaceutically acceptable acid addition salts of the compounds of the general formula wherein Y is a 4-substituted 2-thiazolyl group and Z is

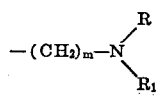

as defined above, formed with both inorganic and organic acids such as hydrochloric, sulfuric, phosphoric, acetic, maleic, malic, succinic, propionic, cinnamic and like acids.

The compounds of the present invention wherein Y is a 4-substituted 2-thiazolyl group are valuable antiparasitic agents, active in vivo against certain organisms known as mammalian parasites; and are particularly active against *Trypanosoma cruzi* and other members of the Trypanosomidae family. The compounds of this invention also have antibacterial activity. The compounds of the general formula wherein Y is a thiocarbamyl group are useful in the preparation of the compounds of the invention wherein Y is a 4-substituted 2-thiazolyl group.

DETAILED DESCRIPTION

This invention provides novel compounds represented by the following general formula:

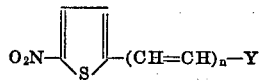

wherein $n$ is 0 or 1 and Y is

or a 2-thiazolyl group of the formula

wherein Z is $C_1$ to $C_4$ lower alkyl, $C_1$ to $C_3$ lower haloalkyl, phenyl, halophenyl, $C_1$ to $C_3$ lower alkylphenyl or an aminoalkyl substituent of the formula

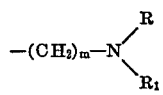

wherein $m$ is an integer from 1 to 3 and R and $R_1$ when taken separately are hydrogen, $C_1$ to $C_4$ lower alkyl, $C_1$ to $C_3$ lower hydroxyalkyl or, when either R and $R_1$ is hydrogen, $C_5$ to $C_8$ cycloalkyl, phenyl, halophenyl or $C_1$ to $C_3$ lower alkylphenyl, and R and $R_1$ when taken together represent a 4-membered alkylene or 5 membered alkylene, oxaalkylene, thiaalkylene or azaalkylene bridge which, together with the nitrogen atom to which they are attached form a 5- or 6-membered heterocyclic ring; and when Z is

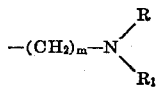

the pharmaceutically acceptable acid addition salts thereof.

The term "$C_1$ to $C_3$ lower alkyl" as used herein refers to methyl, ethyl, n-propyl and isopropyl and the term "$C_1$ to $C_4$ lower alkyl" has reference to methyl, ethyl, n-propyl, isopropyl, n-butyl, isobutyl, and sec-butyl. Halogen as employed herein refers to chlorine and bromine. Z can be an alkylaminoalkyl or cycloalkylaminoalkyl group such as methylaminomethyl, ethylaminomethyl, n-butylaminoethyl, 3 - (methylamino)propyl, isopropylaminomethyl, 2-(methylamino)propyl, cyclohexylaminomethyl, cyclopentylaminomethyl, 4 - ethylcyclohexylaminomethyl and the like; or Z can be a dialkylaminoalkyl group such as dimethylaminomethyl, diethylaminomethyl, diethylaminopropyl, dipropylaminoethyl, dibutylaminomethyl and the like. When Z is $$-(CH_2)_m-N\begin{matrix}R\\R_1\end{matrix}$$

and either R and $R_1$ is hydrogen Z can be cyclohexylaminomethyl, anilinomethyl, p-chloroanilinomethyl, p-methylanilinomethyl and the like. When Z is $$-(CH_2)_m-N\begin{matrix}R\\R_1\end{matrix}$$

and R and $R_1$ are taken together with the nitrogen atom to which they are attached to form a heterocyclic ring, Z can be pyrrolidinomethyl, morpholinomethyl, thiamorpholinoethyl, piperazinomethyl, piperidinomethyl, pyrrolidinopropyl, 4-methylpiperazinomethyl and the like.

The compounds of this invention are prepared by reacting a 2-cyano-5-nitrothiophene or a 2-($\beta$-cyanovinyl)-5-nitrothiophene represented by the formula $$O_2N-\underset{S}{\boxed{\phantom{xx}}}-(CH=CH)_n-C\equiv N$$

wherein $n$ is 0 or 1, with thioacetamide to provide the corresponding thiocarbamyl 5-nitrothiophene of the following formula:

$$O_2N-\underset{S}{\boxed{\phantom{xx}}}-(CH=CH)_n-\underset{\parallel}{\overset{S}{C}}-NH_2$$

The thiocarbamyl 5-nitrothiophene is then reacted with an $\alpha$-haloketone represented by the formula $$X-CH_2-\underset{\parallel}{\overset{O}{C}}-Z$$

wherein X is chloro or bromo and Z has the same meaning as previously defined to provide a compound of the invention represented by the following formula $$O_2N-\underset{S}{\boxed{\phantom{xx}}}-(CH=CH)_n-\underset{S}{\boxed{\overset{N}{\phantom{xx}}}}-Z$$

The desired compound may, in certain instances, contain a group represented by Z which is not conveniently prepared directly by the above procedure. In such instances, for example, when Z is $$-(CH_2)_m-N\begin{matrix}R\\R_1\end{matrix}$$

the desired compound is obtained by first preparing the intermediate haloalkyl compound wherein Z is $$-(CH_2)_m-X$$

which is then reacted with the desired amine. Thus, when in the desired compound, Z is morpholinomethyl, the intermediate chloromethyl compound is first prepared by the above procedure and then reacted with morpholine to give the desired compound.

The reaction of the 2-cyano or 2-($\beta$-cyanovinyl)-5-nitrothiophene with thioacetamide is carried out in dimethylformamide containing hydrogen chloride in solution. Generally, anhydrous dimethylformamide is saturated with anhydrous hydrogen chloride until the exothermic reaction has stopped. The cyano-5-nitrothiophene is next added at a temperature between about 25 and 50° C. and is followed by the addition of thioacetamide. The reaction is allowed to proceed for about three or four hours before work-up. The thiocarbamyl 5-nitrothiophene thus obtained is then reacted with an $\alpha$-haloketone of the formula $$X-CH_2-\underset{\parallel}{\overset{O}{C}}-Z$$

wherein X and Z have the previously assigned meanings, according to the procedure frequently referred to as the Hantzsch thiazole synthesis. The reaction is preferably carried out in refluxing ethanol or in dioxane maintained at a temperature of about 90° C.

The $\alpha$-haloketones, $$X-CH_2-\underset{\parallel}{\overset{O}{C}}-Z$$

useful for the synthesis of the 4-substituted thiazoles of the present invention are readily available starting materials. For example, when Z is $C_1$ to $C_4$ lower alkyl, $\alpha$-haloketones such as chloroacetone, 1-bromo-2-butanone, 1-chloro-2-pentanone, 1-bromo-3-methyl-2-butanone, 1-chloro-2-hexanone and the like can be employed. When Z is phenyl or substituted phenyl, $\alpha$-haloketones such as phenacyl bromide, p-chlorophenacyl bromide, p-ethylphenacyl bromide, m-bromophenacyl bromide and the like, can be used, and when Z is $C_1$ to $C_3$ lower haloalkyl, $\alpha$-haloketones such as 1,3-dichloroacetone, 1,4-dichloro-2-butanone, 1-bromo-5-chloro-2-pentanone and the like can be employed.

As previously mentioned, when Y is a 4-substituted 2-thiazolyl group and Z is $$-(CH_2)_m-N\begin{matrix}R\\R_1\end{matrix}$$

the compounds represented by such formulae are preferably prepared by the reaction of the appropriate amine with a 2-(5'-nitro-2'-thienyl) or 2[2-(5-nitro-2-thienyl)vinyl]-4-haloalkylthiazole.

Those skilled in the art will recognize that when Z is a halomethyl substituent, as for example, chloromethyl, the reaction with the amine proceeds with greater facility than when Z is a 2-haloethyl group or a 3-halopropyl group. Generally, when Z is chloromethyl, the reaction with the desired amine proceeds at a temperature between about room temperature and 75° C., whereas when Z is a 2-haloethyl group or a 3-halopropyl group somewhat higher temperatures are required for substantial reaction. Other factors, such as the basicity of the amine and steric hindrance around the reacting amino nitrogen may necessitate varying reaction conditions. Such necessary variation of reaction conditions will be readily apparent to those skilled in the art.

Alternatively, the compounds of the present invention wherein Y of the general formula represents a 4-substituted 2-thiazolyl group and $n$ is 1 are prepared by reacting 5-nitrothiophene-2-carboxaldehyde with a 2-methylthiazole according to the formula $$O_2N-\underset{S}{\boxed{\phantom{xx}}}-CHO + CH_3-\underset{S}{\boxed{\overset{N}{\phantom{xx}}}}-Z \longrightarrow$$

$$O_2N-\underset{S}{\boxed{\phantom{xx}}}-CH=CH-\underset{S}{\boxed{\overset{N}{\phantom{xx}}}}-Z$$

wherein Z is as defined above. The reaction is carried out in an inert solvent in the presence of a catalyst of the Lewis acid type such as zinc chloride. The 2-methylthiazole reactant is preferably employed in the salt form, for example as the hydrochloride salt.

The preferred method of preparing the compounds of this invention is the first described method which proceeds through a 5-nitrothiophene thiocarbamyl reactant.

Representative compounds of the invention which can be prepared by the above described preferred procedure include 2-(5-nitro-2-thienyl)-4-chloromethylthiazole,
2-[5-nitro-2-thienyl)vinyl]-4-chloromethylthiazole,
2-(5-nitro-2-thienyl)-4-methylthiazole,
2-(5-nitro-2-thienyl)-4-(n-butyl)thiazole,
2-[2-(5-nitro-2-thienyl)vinyl]-4-ethylthiazole, 2-(5-nitro-2-thienyl)-4-phenylthiazole,
2-(5-nitro-2-thienyl)-4-p-bromophenylthiazole,
2-[2-(5-nitro-2-thienyl)vinyl]-4-p-n-propylphenylthiazole,
2-(5-nitro-2-thienyl)-4-p-methylphenylthiazole,
2-(5-nitro-2-thienyl)-4-methylaminomethylthiazole,
2-(5-nitro-2-thienyl)-4-diethylaminoethylthiazole,
2-[2-(5-nitro-2-thienyl)vinyl]-4-di-n-butylaminomethylthiazole,
2-(5-nitro-2-thienyl)4-dimethylaminopropylthiazole,
2-(5-nitro-2-thienyl)-4-anilinomethylthiazole,
2-(5-nitro-2-thienyl)-4-p-toluidinomethylthiazole,
2-[2-(5-nitro-2-thienyl)vinyl]-4-cyclohexylaminomethylthiazole,
2-(5-nitro-2-thienyl)-4-cyclopentylaminoethylthiazole,
2-(5-nitro-2-thienyl)-4-N-methyl-N-(2-hydroxyethyl)-aminomethylthiazole,
2-[2-(5-nitro-2-thienylvinyl]-4-p-chloroanilinomethylthiazole,
2-(5-nitro-2-thienyl)-4-pyrrolidinomethylthiazole,
2-[2-(5-nitro-2-thienyl)vinyl]-4-piperidinomethylthiazole,
2-(5-nitro-2-thienyl)-4-morpholinomethylthiazole,
2-[2-(5-nitro-2-thienyl)vinyl]-4-(4-methylpiperazino)-methylthiazole,
2-(5-nitro-2-thienyl)-4-pyrrolidinoethylthiazole,
2-(5-nitro-2-thienyl)-4-(3-morpholinopropyl)thiazole,
2-(5-nitro-2-thienyl)-4-(2-piperidinopropyl)thiazole,
2-[2-(5-nitro-2-thienyl)vinyl]-4-(2,6-dimethylpiperazino)methylthiazole, and
2-[2-(5-nitro-2-thienyl)vinyl]-4-piperidinomethylthiazole.

The acid addition salts of the compounds of the invention can be prepared in the usual manner. For example, the hydrochloride salt can be prepared by dissolving the compound as the free base in anhydrous ether and then saturating the solution with anhydrous hydrogen chloride. For the preparation of salts formed with organic acids, varying procedures generally well recognized in the art can be employed. For example, the compound of the invention, as the free base, can be titrated with the desired salt forming organic acid in a suitable solvent such as acetone or ether.

The novel compounds of this invention represented by the general formula wherein Y is a 4-substituted 2-thiazolyl group and Z is

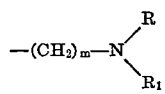

as previously defined are useful antiparasitic and antibacterial agents. In particular, the compounds of this invention are useful in the treatment of diseases caused by the infectious protozoa, especially the trypanosomes, *Trypanosoma cruzi, Trypanosoma rhodesiense, Trypanosoma gambiense* and *Trypanosoma congolense*. The compounds are particularly efficacious in the treatment of *T. cruzi* infections.

Accordingly the compounds of the general formula wherein Y is 4-substituted 2-thiazolyl and Z is

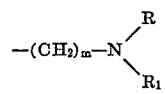

and the pharmaceutically acceptable salts thereof are effective when administered parenterally at doses of between about 75 to 500 mg./kg. per day for 5 days in the treatment of trypanosomiasis. It will be understood by those skilled in the art that the size of the dose and the frequency and duration of administration will vary, depending upon such conditions as the severity of the infection, the species of the infecting parasitic organism, the size and general health of the host and the like. For example, when administered parenterally at a dose of about 75 to 500 mg./kg. to mice infected with trypanosomes the compounds of the invention are effective in prolonging the survival time of the treated mice over the non-treated control mice.

The compounds of this invention are relatively non-toxic to mammalian species. For example, the oral $LD_{50}$ in mice is between about 200 to greater than 1600 mg./kg. The compounds are somewhat more toxic when administered to mice by the intraperitoneal route. For example, $LD_{50}$ values in mice range from about 90 to greater than 1000 mg./kg., i.p.

The compounds of this invention also inhibit the growth of *Staphylococcus aureus*, a common gram-positive organism pathogenic to animals.

Accordingly, antiseptic solutions or suspensions containing a compound of the invention in an effective concentration can be prepared for the treatment of surface infections of the host. Such solutions can be prepared by employing any of a number of suitable solvents, for example, water, ethanol and glycerol.

The compounds of the present invention wherein Y is a thiocarbamyl group are useful as intermediates in the preparation of the antiparasitic agents of the invention. Similarly, the compounds of the general formula, wherein Y is a 4-substituted 2-thiazolyl group and Z is haloalkyl, are useful intermediates for the preparation of the antiparasitic compounds of the invention.

The following examples more fully illustrate the present invention.

EXAMPLE 1

5-nitro-2-thiocarbamylthiophene

Anhydrous hydrogen chloride was passed into 750 ml. of anhydrous dimethylformamide with cooling until the exothermic reaction had ceased, and 92.3 g. (0.6 mole) of 5-nitro-2-cyanothiophene were added at a temperature of 40° C. Thioacetamide, 90 g. (1.2 mole) was added to the above solution with stirring and the reaction mixture stirred at about 40° C. for three hours. The resulting dark red solution was poured onto four liters of an ice-water mixture and stirred for 30 minutes. The bright orange precipitate which formed was filtered, slurried in water, refiltered and dried to yield 101 g. of 5-nitro-2-thiocarbamylthiophene melting at about 185–190° C.

*Analysis.*—Calculated (percent): C, 31.90; H, 2.14; N, 14.88. Found (percent): C, 31.80; H, 2.39; N, 14.60.

EXAMPLE 2

2-(5-nitro-2-thienyl)-4-p-chlorophenylthiazole 5-nitro-2-thiocarbamylthiophene, 5.65 g. (0.03 mole) and p-chlorophenacyl bromide, 7.0 g. (0.03 mole) were dissolved in 80 ml. of ethanol in an atmosphere of nitrogen and the solution heated under reflux with stirring for two hours. The reaction mixture was cooled, and the resulting yellow-brown precipitate filtered and washed with cold ethanol and dried to yield 8.65 g. of 2-(5-nitro-2-thienyl)-4-p-chlorophenylthiazole melting at about 195–198° C. The product was recrystallized from benzene (charcoal) to yield orange-yellow prisms melting at about 201–202° C.

*Analysis.*—Calculated (percent): C, 48.37; H, 2.20; N, 8.68. Found (percent): C, 48.20; H, 2.06; N, 8.63.

EXAMPLE 3

2-(5-nitro-2-thienyl)-4-phenylthiazole 5-nitro-2-thiocarbamylthiophene, 5.65 g. (0.03 mole) and phenacyl bromide, 6.0 g. (0.03 mole) were dissolved in 75 ml. of ethanol and the solution heated under reflux with stirring for three hours.

The reaction mixture was cooled and the brown precipitate which formed was filtered and washed with cold ethanol before drying to yield 7.4 g. of 2-(5-nitro-2-thienyl)-4-phenylthiazole melting at about 175–180° C. The product on recrystallization from dioxane (charcoal) gave olive-green plates melting at about 182–185° C.

*Analysis.*—Calculated (percent): C, 54.15; H, 2.80; N, 9.72. Found (percent): C, 53.90; H, 2.71; N, 9.95.

EXAMPLE 4

2-(5-nitro-2-thienyl)-4-chloromethylthiazole

A suspension of 5-nitro-2-thiocarbamylthiophene, 51.5 g. (0.27 mole) and 1,3-dichloroacetone, 69.6 g. (0.55 mole) in 55 ml. of dioxane was heated at a temperature of about 90° C. for 1.5 hours with stirring. The reaction mixture was then poured into 400 ml. of water and the dark brown solid was filtered and washed with hot water before drying to yield 68 g. of 2-(5-nitro-2-thienyl)-4-chloromethylthiazole melting at about 154° C.

The above crude product was boiled with chloroform (800 mls.) and separated from some insoluble matter by filtration. The hot filtrate was treated with charcoal, filtered and evaporated until crystallization commenced. After cooling to 0° C. the orange crystalline solid was collected and dried.

Yield: 52.6 g.; M.P. about 160° C.

*Analysis.*—Calculated (percent): C, 36.85; H, 1.93; N, 10.75. Found (percent): C, 36.70; H, 2.12; N, 10.71.

EXAMPLE 5

2-(5-nitro-2-thienyl)-4-(N-morpholinomethyl)thiazole and hydrochloride 2-(5-nitro - 2 - thienyl)-4-chloromethylthiazole (5.2 g.; 0.02 mole) was added to morpholine (10 ml.) at room temperature in an atmosphere of nitrogen with stirring. The temperature slowly rose to 50° C. and then decreased, whereupon the color changed to olive-green and a crystalline solid separated. After 30 minutes reaction time, the mixture was poured onto water (100 ml.) and stirred for 10 minutes, and the resultant yellow-green solid was filtered off, washed with water and dried Yield: 5.88 g. 2-(5-nitro-2-thienyl)-4-(N-morpholinomethyl)thiazole (95); M. P. 120–125° C.

Recrystallization from ethanol (charcoal) gave yellow-orange needles; yield 4.92 g., M.P. 129–130° C.

*Analysis.*—Calculated (percent): C, 46.29; H, 4.21; N, 13.50. Found (percent): C, 46.10; H, 4.51; N, 13.40.

The above thiazole (3.0 g.) was dissolved in dioxan (75 ml.) and a slight excess of ethereal HCl was added. The yellow crystalline hydrochloride was collected, washed with ether and dried.

Yield: 3.32 g. hydrochloride; M.P. 220–221° C.

Recrystallization from dilute hydrochloric acid gave yellow needles; yield 2.66 g., M.P. 230–232° C.

*Analysis.*—Calculated (percent): C, 41.43; H, 4.06; N, 12.09. Found (percent): C, 41.55; H, 4.40; N, 11.97.

EXAMPLE 6

2-(5-nitro-2-thienyl)-4-(N-pyrrolidinomethyl)thiazole and hydrochloride 2-(5-nitro - 2 - thienyl)-4-chloromethylthiazole (6.5 g.; 0.025 mole) was added in small portions to a stirred solution of pyrrolidine (15 ml.) in dioxan (60 ml.) at room temperature. The internal temperature rose gradually to 30° C. and then decreased. After 75 minutes reaction time, a thin layer chromatographic examination (Merck silica gel $P_{254}$; solvent $CHCl_3$) indicated the absence of starting thiazole. The reaction mixture was poured into water (400 ml.) and the resultant olive-green solid was collected, washed with water and dried.

Yield: 6.28 g. 2-(5-nitro-2-thienyl)-4-(N-pyrrolidinomethyl)thiazole; M.P. 74° C.

The above pyrrolidinomethyl thiazole was extracted with hot ether (50 ml.) and filtered. The hot filtrate was treated with charcoal and refiltered; addition of a slight excess of ethereal HCl to the cooled filtrate gave a precipitate of the yellow hydrochloride which was collected, washed with ether and dried.

Yield: 6.8 g. hydrochloride; M.P. 216–218° C.

Recrystallization from a mixture of ethanol and ether (charcoal) gave the pure product.

Yield: 5.2 g.; M.P. 219–221° C.

*Analysis.*—Calculated (percent): C, 43.44; H, 4.25; N, 12.67. Found (percent): C, 43.70; H, 4.61; N, 12.55.

EXAMPLE 7

Following procedures analogous to the methods described in Examples 5 and 6 the following compounds were prepared by employing 2-(5-nitro-2-thienyl)-4-chloromethylthiazole and the indicated amine.

2 - (5 - nitro-2-thienyl)-4-(4-methylpiperazinomethyl)thiazole hydrochloride melting at about 235–238° C. was prepared with 4-methylpiperazine.

2-(5-nitro-2-thienyl)-4-diethylaminomethylthiazole hydrochloride melting at about 173–174° C. was prepared with diethylamine.

*Analysis.*—Calculated (percent): C, 43.18; H, 4.83; N, 12.57. Found (percent): C, 43.25; H, 5.4; N, 12.57.

2-(5-nitro-2-thienyl)-4-piperidinomethylthiazole hydrochloride melting at about 215–217° C. was prepared with piperidine.

*Analysis.*—Calculated (percent): C, 45.14; H, 4.66; N, 12.15. Found (percent): C, 45.25; H, 4.79; N, 11.93.

2-(5-nitro-2-thienyl)-4-N-methyl-N-(2-hydroxymethyl)-aminomethylthiazole hydrochloride melting at about 216–218° C. was prepared with N-methyl-2-hydroxyethylamine.

*Analysis.*—Calculated (percent): C, 39.22; H, 4.20; N, 12.52. Found (percent): C, 39.20; H, 4.41; N, 12.23.

2 - (5-nitro-2-thienyl)-4-cyclohexylaminomethylthiazole hydrochloride melting at about 224–225° C. was prepared with cyclohexylamine.

*Analysis.*—Calculated (percent): C, 46.72; H, 5.04; N, 11.68. Found (percent): C, 46.90; H, 4.65; N, 11.69.

EXAMPLE 8

5-nitro-2-vinylthiocarbamyl thiophene 5-nitro-2-thienylacrylonitrile (1.8 g.; 0.01 mole) was dissolved in a dry equimolar mixture of dimethyl formamide and hydrogen chloride (7.8 ml.) at 45° C. To this was added thioacetamide (1.5 g.; 0.01 mole) and the mixture was stirred at this temperature for two hours after which a thin layer chromatographic examination (Merck silica gel $P_{254}$; solvent benzene) indicated the absence of starting nitrile. After pouring onto iced water (50 ml.) the dark orange precipitate was collected, washed with water and dried.

Yield: 2 g. 5-nitro-2-vinylthiocarbamyl thiophene (93%); M.P. 175–180° C.

The above crude vinylthiocarbamyl thiophene was extracted with boiling acetone (200 ml.), charcoaled and filtered. Evaporation of the filtrate gave an orange-red solid (1.4 g.). Recrystallization from acetone/petroleum ether (B.P. 40–60° C.) gave the analytical sample, M.P. 180° C.

*Analysis.*—Calculated (percent): C, 39.24; H, 2.82; N, 13.07. Found (percent): C, 39.50; H, 2.92; N, 12.97.

EXAMPLE 9

2-[2-(5-nitro-2-thienyl)vinyl]-4-chloromethylthiazole

A mixture of 5-nitro-2-vinylthiocarbamyl thiophene (1.4 g.; 0.0065 mole), 1,3-dichloroacetone (1.6 g.; 0.13 mole) and dioxane (4 ml.) were heated together at 90° C. After 15 minutes a thin layer chromatographic examination (Merck silica gel $P_{254}$; solvent system benzene; ethyl acetate (1:1)) indicated the absence of starting thiophene. The reaction mixture was poured onto iced water (100 g.) and the semi-solid product extracted (2× 150 ml.) with chloroform. The combined chloroform extracts were heated to reflux, charcoaled and filtered, and the filtrate was evaporated in vacuo to yield an orange-red semi-crystalline product. Recrystallization from isopropanol gave the chloromethyl thiazole as orange-red rods.

Yield: 800 mg. 2-[2-(5-nitro-2-thienyl)vinyl-4-chloromethylthiazole (45%); M.P. 142–144° C.

*Analysis.*—Calculated (percent): C, 41.90; H, 2.45; N, 9.80. Found (percent): C, 41.1; H, 2.84; H, 9.22.

EXAMPLE 10

2-[2-(5-nitro-2-thienyl)vinyl]-4-(N-morpholinylmethyl) thiazole hydrochloride

Morpholine (2.5 ml.) was added to a solution of 2-[2-(5-nitro-2-thienyl)vinyl]-4-chloromethylthiazole (1.0 g.; 0.0035 mole) in dioxane (12 ml.) at room temperature. The mixture was stirred and heated at 70° C. for three hours when a thin layer chromatographic examination (Merck silica gel $P_{254}$; solvent system benzene; ethyl acetate (1:1)) indicated the absence of starting chloromethyl thiazole. The reaction mixture was poured onto iced water (200 ml.) and the green solid collected, washed with water and dried.

Yield: 1.0 g. crude 2-[2-(5-nitro-2-thienyl)vinyl]-4-(N-morpholinylmethyl)thiazole.

This crude product was extracted with a 1:1 mixture of boiling ethyl acetate; ether (200 ml.) and charcoaled, and the resultant light yellow filtrate was evaporated to dryness in vacuo. The N-morpholinylmethyl thiazole thus produced was immediately dissolved in dry ether (25 ml.). Addition of a slight excess of ethereal HCl have a precipitate of the yellow hydrochloride which was collected, washed with ether, and dried.

Yield: 500 mg. hydrochloride; M.P. 220–223° C.

*Analysis.*—Calculated (percent): C, 45.05; H, 4.30; N, 11.25. Found (percent): C, 44.50; H, 3.60; N, 10.72.

EXAMPLE 11

2-(5-nitro-2-thienyl)-4-(2:6-dimethylmorpholino) methylthiazole hydrochloride 2-(5-nitro-2-thienyl)-4-chloromethylthiazole (5.2 g. 0.02 mole) and 2:6 dimethylmorpholine (8 ml.) were dissolved in dioxane (10 ml.) and warmed with stirring to ca. 50° C. for one hour. The dark solution was poured into water (200 ml.) giving an oily precipitate that rapidly crystallized. This solid collected, washed with water and dried.

Yield: 7.5 g.

This crude product was extracted with boiling ether (100 ml.), the extracts treated with charcoal, filtered and the filtrate treated with an excess of ethereal/hydrogen chloride giving a yellow precipitate of the hydrochloride salt.

This was recrystallized from methanol/ether giving 5.0 g. of crystalline product melting at 204–205° C.

*Analysis.*—Calculated (percent): C, 44.73; H, 4.83; N, 11.18. Found (percent): C, 44.71; H, 5.01; N, 11.20.

We claim:
1. A compound of the formula

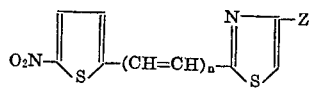

wherein $n$ is 0 or 1 and Z is $C_1$–$C_3$ lower haloalkyl, halophenyl, or an aminoalkyl substituent of the formula

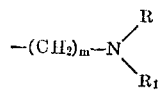

wherein $m$ is an integer from 1 to 3 and R and $R_1$ when taken separately are hydrogen, $C_1$ to $C_4$ lower alkyl, $C_1$ to $C_3$ lower hydroxyalkyl, or when either of R and $R_1$ is hydrogen, $C_5$ to $C_8$ cycloalkyl, phenyl, halophenyl or $C_1$ to $C_3$ lower alkylphenyl and R and $R_1$ when together represent a 4-membered alkylene or 5-membered alkylene, oxaalkylene, thiaalkylene or azaalkylene bridge which, together with the nitrogen atom to which they are attached form a 5- or 6-membered heterocyclic ring selected from the group consisting of pyrrolidine, piperidine, morpholine, 2,6-dimethylmorpholine, thiomorpholine, piperazine and 4-methylpiperazine;

and when Z is

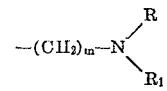

the pharmaceutically acceptable acid addition salts thereof.

2. The compound of claim 1 wherein $n$ is 0 and Z is an aminoalkyl substituent of the formula

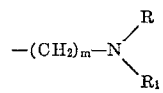

and the pharmaceutically acceptable acid addition salts thereof.

3. The compound of claim 2 wherein Z is a morpholinomethyl group, said compound being 2-(5-nitro-2-thienyl)-4-morpholinomethylthiazole.

4. The compound of claim 2 wherein Z is a pyrrolidinomethyl group, said compound being 2-(5-nitro-2-thienyl)-4-pyrrolidinomethylthiazole.

5. The compound of claim 2 wherein Z is a piperidinomethyl group, said compound being 2-(5-nitro-2-thienyl)-4-piperidinomethylthiazole.

6. The compound of claim 2 wherein Z is a 4-methylpiperazinomethyl group, said compound being 2-(5-nitro-2-thienyl)-4-(4-methylpiperazinomethyl)thiazole.

7. The compound of claim 1 wherein $n$ is 1 and Z is an aminoalkyl substituent of the formula

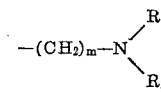

8. The compound of claim 7 wherein Z is a morpholinomethyl group, said compound being 2-[2-(5-nitro-2-thienyl)vinyl]-4-morpholinomethylthiazole.

9. The compound of claim 7 wherein Z is a pyrrolidinomethyl group, said compound being 2-[2-(5-nitro-2-thienyl)vinyl]-4-pyrrolidinomethylthiazole.

References Cited

FOREIGN PATENTS 969,031  9/1964  England _____ 260—302

OTHER REFERENCES

Chemical Abstracts, vol. 66, subject index page 3449 S, copyright 1968, received July 19, 1968 in Pat. Off. Sci. Lib.

Chemical Abstracts, vol. 67, subject index page 3494 S, published Dec. 31, 1967.

Chemical Abstracts, vol. 68, subject index pages 3744 S to 3745 S, published June 30, 1968.

Chemical Abstracts, vol. 67, abstract No. 97907v (1967), (abstract of Fujimoto).

Chemical Abstracts, vol. 68, abstract No. 47321z (1968), abstract of Fujimoto et al.).

Chemical Abstracts, vol. 68, abstract No. 75939a (1968), (abstract of Fujimoto).

JOHN D. RANDOLPH, Primary Examiner

U.S. Cl. X.R.

260—243, 247.1, 268 HET, 293.68, 302 H; 424—246, 248, 250, 267, 270.